United States Patent
Kodali et al.

(10) Patent No.: US 10,528,211 B2
(45) Date of Patent: Jan. 7, 2020

(54) COMPUTING SYSTEMS AND PROCESSES FOR SIMULTANEOUS CO-DEVELOPMENT OF DASHBOARD INTERFACES

(71) Applicant: salesforce.com, inc., San Francisco, CA (US)

(72) Inventors: Mrudula Kodali, San Francisco, CA (US); Eli Brumbaugh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 272 days.

(21) Appl. No.: 14/878,740

(22) Filed: Oct. 8, 2015

(65) Prior Publication Data

US 2017/0102833 A1  Apr. 13, 2017

(51) Int. Cl.
*G06F 3/00* (2006.01)
*G06F 3/0481* (2013.01)
*G06F 3/01* (2006.01)

(52) U.S. Cl.
CPC ................... *G06F 3/0481* (2013.01)

(58) Field of Classification Search
CPC ....... G06F 3/0481; G06F 9/45504; G06F 9/50
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,049,334 A * | 4/2000 | Bates ................... G06F 3/0481 715/745 |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |

(Continued)

OTHER PUBLICATIONS

McLean et al. NPL—"Access/Control Icons (Icon Keys)" Original Publication Date: Apr. 1, 1995 Original Disclosure Information: TDB v38 n4 Apr. 1995 p. 407-410 IP.com No. IPCOM000115342D IP.com Electronic Publication Date: Mar. 30, 2005; (Year: 1995).*

*Primary Examiner* — Nicholas Augustine
(74) *Attorney, Agent, or Firm* — LKGlobal | Lorenz & Kopf, LLP (57) ABSTRACT

A computer system facilitates the collaborative design and presentation of graphical dashboard displays or the like by initiating the presentation of dashboard imagery on each of the collaborating system displays. When a user of a client system identifies an object of the dashboard display for editing, instructions are sent to each of the other collaborating systems to identify the editing party and to prevent simultaneous edits of the same object by multiple parties. Edited objects may be shaded, colored or otherwise highlighted to provide additional information about the editor, the changes being made or the like.

17 Claims, 4 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,188,316 B2 * | 3/2007 | Gusmorino .......... G06F 16/168 715/764 |
| 7,289,964 B1 * | 10/2007 | Bowman-Amuah ...................... G06F 9/5038 705/1.1 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,774,703 B2 * | 8/2010 | Junuzovic ............. G06Q 10/10 715/229 |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 * | 10/2013 | Rueben ..................... G06T 1/00 707/705 |
| 8,646,103 B2 | 2/2014 | Jakobson et al. |
| 9,635,091 B1 * | 4/2017 | Laukkanen .......... H04L 67/025 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0052371 A1 * | 2/2008 | Partovi ................. G06Q 10/10 709/217 |
| 2008/0249972 A1 | 10/2008 | Dillon |
| 2009/0063414 A1 | 3/2009 | White et al. |
| 2009/0069912 A1 * | 3/2009 | Stefik ..................... G06Q 30/02 700/94 |
| 2009/0100342 A1 | 4/2009 | Jakobson |
| 2009/0144741 A1 * | 6/2009 | Tsuda .................... G06F 9/5027 718/104 |
| 2009/0177744 A1 | 7/2009 | Marlow et al. |
| 2009/0254838 A1 * | 10/2009 | Rao ....................... G06F 16/337 715/749 |
| 2010/0180213 A1 * | 7/2010 | Karageorgos .......... G06F 16/93 715/753 |
| 2010/0192072 A1 * | 7/2010 | Spataro ................. G06Q 10/107 715/753 |
| 2010/0205541 A1 * | 8/2010 | Rapaport ............... G06Q 10/10 715/753 |
| 2011/0106662 A1 * | 5/2011 | Stinchcomb ........... G06Q 30/06 705/26.43 |
| 2011/0247051 A1 | 10/2011 | Bulumulla et al. |
| 2012/0042218 A1 | 2/2012 | Cinarkaya et al. |

(56) References Cited

U.S. PATENT DOCUMENTS

| | | | |
|---|---|---|---|
| 2012/0078953 A1* | 3/2012 | Araya | H04N 5/44543 |
| | | | 707/769 |
| 2012/0096041 A1* | 4/2012 | Rao | G06F 16/337 |
| | | | 707/794 |
| 2012/0102402 A1* | 4/2012 | Kwong | G06F 3/038 |
| | | | 715/705 |
| 2012/0130973 A1* | 5/2012 | Tamm | G06Q 10/00 |
| | | | 707/706 |
| 2012/0218958 A1 | 8/2012 | Rangaiah | |
| 2012/0226803 A1* | 9/2012 | Bharadwaj | H04L 41/0253 |
| | | | 709/224 |
| 2012/0233137 A1* | 9/2012 | Jakobson | G06F 3/04847 |
| | | | 707/695 |
| 2012/0278725 A1* | 11/2012 | Gordon | H04N 21/2665 |
| | | | 715/738 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0282229 A1* | 9/2014 | Laukkanen | G06F 3/0481 |
| | | | 715/788 |
| 2015/0205453 A1* | 7/2015 | Carlos | G06F 3/04883 |
| | | | 715/798 |
| 2015/0341401 A1* | 11/2015 | Lee | H04L 65/403 |
| | | | 715/753 |
| 2016/0050168 A1* | 2/2016 | Zutphen | H04L 51/046 |
| | | | 715/752 |
| 2016/0259508 A1* | 9/2016 | Eccleston | G06F 3/0484 |
| 2017/0003829 A1* | 1/2017 | Wilde | H04L 67/125 |

* cited by examiner

COMPUTING SYSTEMS AND PROCESSES FOR SIMULTANEOUS CO-DEVELOPMENT OF DASHBOARD INTERFACES

TECHNICAL FIELD

The following relates to computer graphics, and more particularly relates to computing systems and processes for controlling the simultaneous presentation of graphical imagery on multiple computer displays. Although the following may be used in many different settings and applications, various embodiments could be used in the collaborative development of dashboard displays for cloud computing platforms or the like.

BACKGROUND

Dashboards are graphical displays that are generated by a computer to collect, organize and present information for the user in a useful manner. Similar to automotive dashboards, computerized dashboards typically provide graphical or other reports representing different types of information in an easy-to-read format. In the case of a database system used for tracking sales data, for example, dashboard displays can present graphical or other information about real time sales, hourly/daily/weekly/monthly/yearly sales figures, and/or other useful information as desired within a shared screen or other display. Other dashboards could be formulated to report web site traffic, manufacturing data, order or shipping details, and/or virtually any other data that can be measured or otherwise quantified. Dashboards are commonly used to present real-time or other data across a wide array of different applications and settings.

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware.

More recently, multi-tenant cloud-based architectures have been developed to improve collaboration, integration and community-based improvement between customer tenants without sacrificing data security. Generally speaking, multi-tenancy refers to a system wherein a single hardware and software platform simultaneously supports multiple user groups from a common data store. The Force.com service available from salesforce.com of San Francisco, Calif., for example, provides an application-centric approach that abstracts the server hardware altogether and allows multiple tenants to simultaneously yet securely implement a wide variety of applications.

Although multi-tenant and other cloud computing platforms can provide substantial benefits, challenges can arise in designing, building and operating such systems. The need to flexibly represent the many different types of data tracked by different tenants, for example, can present challenges in designing dashboard displays. In particular, it can be a substantial technical challenge to support creation of custom dashboard displays, particularly in collaborative environments where multiple users desire to make simultaneous changes to graphical or other dashboard elements.

BRIEF DESCRIPTION

Various embodiments provide a process executable by a cloud server or other computer system to simultaneously generate imagery (such as dashboard imagery) having a plurality of objects on a plurality of different client computing systems each operated by different user. In this example, the process suitably comprises receiving a first input from a first one of the plurality of client computing systems at the computer system that identifies one of the objects of the dashboard imagery to be edited by a first user; and, in response to the first input, providing a first instruction from the computer system to the first one of the plurality of client computing systems to thereby enable editing of the identified object by the first user while the dashboard imagery is presented by the first client computing system, and also providing at least one second instruction from the computing system to each of the other client computing systems directing the other client computing systems to disable editing of the identified object by the different users while the dashboard imagery is presented by the other client computing systems.

Other examples provide processes executable by a personal computer, tablet computer, mobile phone or other client computing system to present dashboard imagery having a plurality of objects on a display. This example process suitably comprises: establishing a session with a server system via a network; receiving data corresponding to each of the plurality of objects in the dashboard imagery via the session from the server system; presenting the dashboard imagery including on the display based upon the data received from the server system; receiving a first user input selecting one of the plurality of objects to be edited using the client computing system; transmitting a first message to the server system via the session to identify the selected object to be edited using the client computing system; receiving a first instruction from the server system via the session to thereby enable editing of the identified object by the client computing system; updating the dashboard imagery to change the appearance of the selected object presented on the display; and in response to further user inputs, providing edit instructions to the server system via the session to thereby permit the server system to forward the edit instructions to other client computing systems and thereby enable the other client computing systems to display edits to the selected object in real time.

Still other embodiments provide a cloud-based or other computer system to simultaneously generate dashboard imagery having a plurality of objects on a plurality of different client computing systems each operated by different user, the computer system comprising a processor, a memory and an input/output interface. The processor suitably executes an application that performs an automated process that comprises receiving, via the input/output interface, a first input from a first one of the plurality of client computing systems at the computer system that identifies one of the objects of the dashboard imagery to be edited by a first user; and, in response to the first input, providing a first instruction to the first one of the plurality of client computing systems via the input/output interface to thereby enable editing of the identified object by the first user while the dashboard imagery is presented by the first client computing system, and also providing at least one second instruction via the input/output interface to each of the other client computing systems directing the other client computing systems to disable editing of the identified object by the different users while the dashboard imagery is presented by the other client computing systems.

Other embodiments and examples could provide processes executed by client or server systems, data processing systems to provide client or server functionality, and/or any number of other systems, processes, devices or other aspects of the concepts set forth herein. While the examples above tend to focus on the collaborative development of dashboard interfaces for cloud computing platforms, equivalent concepts could be readily applied to any number of other environments.

DESCRIPTION OF THE DRAWING FIGURES

Exemplary embodiments will hereinafter be described in conjunction with the following drawing figures, wherein like numerals denote like elements.

DETAILED DESCRIPTION

According to various embodiments, systems and processes are provided to improve the collaborative design of dashboard displays through the simultaneous presentation of graphical user interfaces on multiple client computing systems. As a user selects a dashboard object to edit, the system blocks that object for editing by other users. Although other users are prevented from simultaneously editing the same object, other users may view real time updates to the edited object so they are able to see the changes as they are made. Any number of simultaneous users may be supported, thereby allowing different users to make changes to different objects at the same time while viewing real time changes made by other users. Various embodiments additionally provide chat, commenting, sharing, permission setting and/or other features. Further embodiments could also allow "meta dashboards", or display of metrics about the dashboard itself. In contrast to prior dashboard development systems in which only one user was able to edit the dashboard interface at a time, the dashboard design process can be made much more efficient and effective by allowing dashboards to be edited and reviewed in a collaborative, simultaneous multi-user setting.

Figure 1:
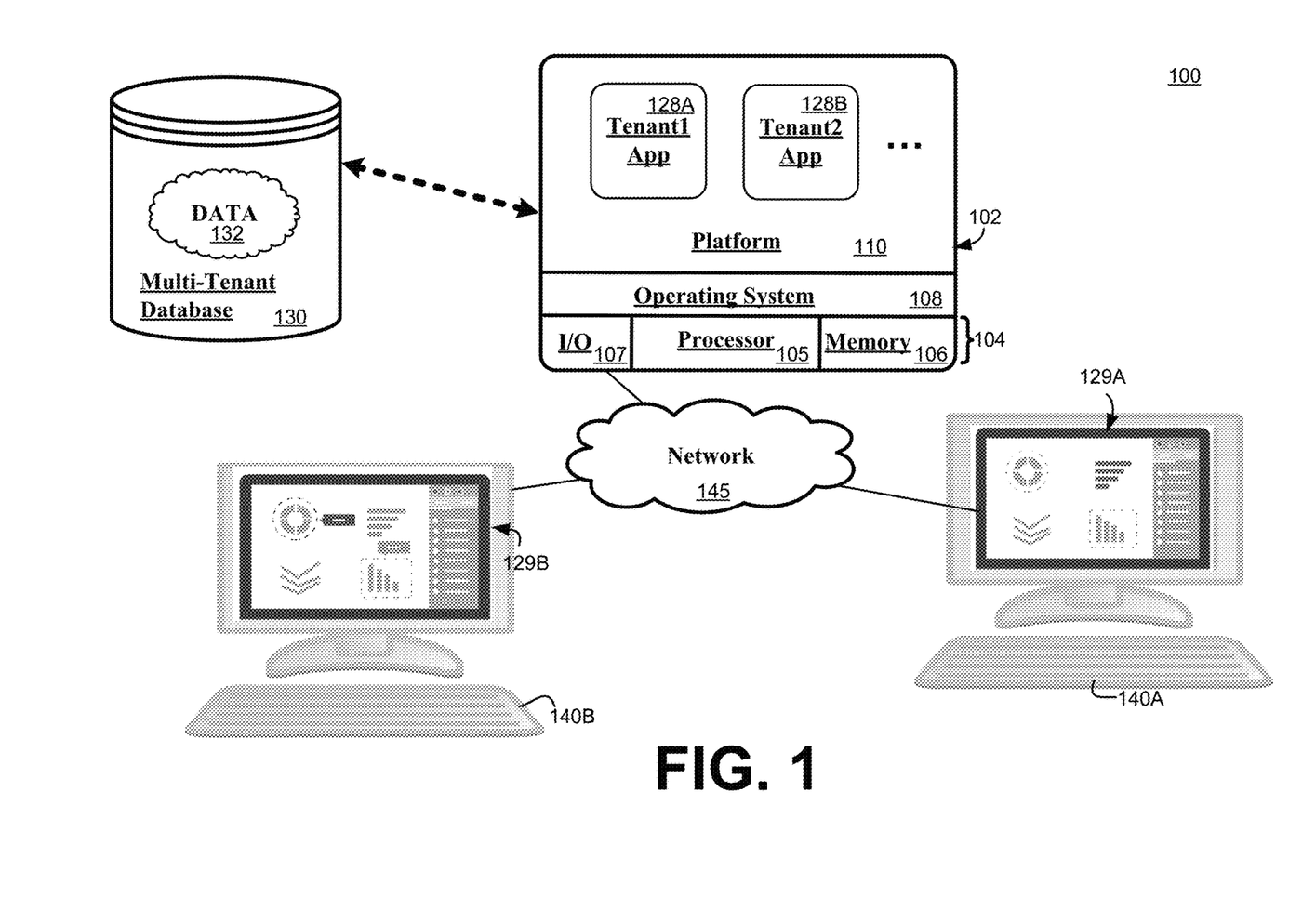
FIG. 1 is a block diagram of one example of a data processing system that supports collaborative design of dashboard interfaces.

The general concepts and systems described herein may be applied in any number of different computing settings to support any number of different data types, processing environments and/or presentation systems. FIG. 1 presents one example of collaborative dashboard development implemented within the context of a multi-tenant computing system. Other embodiments could be developed to execute in any other collaborative computing environment, including any sort of server based, peer-to-peer or other networked environment in which multiple users view displays generated in response to data obtained from a shared server or other resource.

Turning now to FIG. 1, an example of a multi-tenant application system 100 suitably includes a server 102 operating a platform 110 that dynamically creates virtual applications 128A-B based upon data 132 from a common database 130 that is shared between multiple tenants. Data and services generated by the virtual applications 128A-B are provided via network 145 to any number of client devices 140A-B, as desired.

Platform no allows applications 128A-B to provide any number of dashboard displays 129 that each include any number of graphs, charts, tables or other display objects. Each object in the dashboard display 129 presents a graphical representation of a numerical or other metric related to the application 128. Examples of metrics that could be represented with dashboard objects could include customer service or order data, numbers of customer contacts, percentage achieved toward a goal and/or any other metrics as desired.

During the dashboard design process, users of various client devices 140 are able to simultaneously design and edit the displays presented, with each user seeing updates made by other users in real time (considering some delay inherent in data processing, network transmission and the like). Examples of dashboard interfaces 129 are described with respect to FIGS. 2 and 4 below.

Each virtual application 128A-B is suitably generated at run-time using a common platform 110 that securely provides access to data 132 in database 130 for each of the various tenants subscribing to system 100. Each application 128A-B can include routines and processes for receiving data, processing the data, and reporting data to one or more users. The reporting of data may be provided through one or more dashboard interfaces as described herein.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Data 132 may be organized and formatted in any manner to support application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables or other structures that establish indexing, uniqueness, relationships between entities, and/or other aspects of conventional database organization as desired.

Further data manipulation and report formatting is generally performed at run-time using a variety of meta-data constructs. Metadata within a universal data directory (UDD), for example, can be used to describe any number of forms, reports, workflows, user access privileges, business logic and other constructs that are common to multiple users of database 132. Tenant-specific formatting, functions and other constructs may be maintained as tenant-specific metadata for each tenant, as desired. Rather than forcing data 132 into an inflexible global structure that is common to all tenants and applications, then, database 130 is organized to be relatively amorphous, with tables and metadata providing additional structure on an as-needed basis. To that end, application platform 110 suitably uses tables and/or metadata to generate "virtual" components of applications 128A-B that logically obtain, process, and present the relatively amorphous data 132 from database 130. Such tables and metadata may be used to define one or more dashboard displays, as appropriate.

Server 102 is implemented using one or more actual and/or virtual computing systems that collectively provide a dynamic application platform no for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

Application platform 110 is any sort of software application or other data processing engine that generates virtual applications 128A-B that provide data and/or services to client devices 140A-B. Virtual applications 128A-B are typically generated at run-time in response to queries received from client devices 140A-B, as described more fully below. To that end, platform 110 dynamically builds and executes dashboard displays and other aspects of virtual applications 128A-B in response to specific requests received from client devices 140A-B. Virtual applications 128A-B are typically constructed in accordance with tenant-specific metadata, which describes the particular tables, reports/dashboards, interfaces and/or other features of the particular application. In various embodiments, each virtual application 128A-B generates dynamic web content that can be served to a browser or other client program 142A-B associated with client device 140A-B, as appropriate. Applications 128 may contain JAVA, .NET and/or other content that can be presented using conventional client software running on client device 140; other embodiments may simply provide dynamic web or other content that can be presented and viewed by the user, as desired.

In operation, then, developers use application platform 110 to create data-driven virtual applications 128A-B for the tenants that they support. Such applications 128A-B may make use of interface features such as tenant-specific screens, universal screens and/or the like. Any number of tenant-specific and/or universal objects may also be available for integration into dashboards or other aspects of tenant-developed applications 128A-B. Data 132 associated with each application 128A-B is provided to database 130, as appropriate, and stored until requested, along with metadata that describes the particular features (e.g., reports, tables, functions, etc.) of tenant-specific application 128A-B until needed.

Data and services provided by server 102 can be retrieved using any sort of personal computers, mobile telephones, tablets or other network-enabled client devices 140A-B on network 145. Typically, the user operates a conventional browser or other client program to contact server 102 via network 145 using, for example, the hypertext transport protocol (HTTP) or the like. In some implementations, HTTP "get" and "put" statements may be transmitted over a transmission control protocol (TCP) session or the like to pass various messages, instructions and data relating to the display and design of interface objects, as described more fully below. In many implementations, a Javascript, ActiveX or other applet executing within the browser of client device 140 generates interface features to be displayed in response to instructions received from the server 102; equivalent embodiments may use any sort of application program interface (API), application or other feature executing on client computing devices 140 to render graphical imagery to the display.

To collaboratively create dashboard interfaces, then, a group of users using any number of client computing systems 140A-B are each able to view interfaces 129A-B (respectively) showing the draft dashboard display and indicating which users are actively editing the different component objects of the displays.

Figure 2:
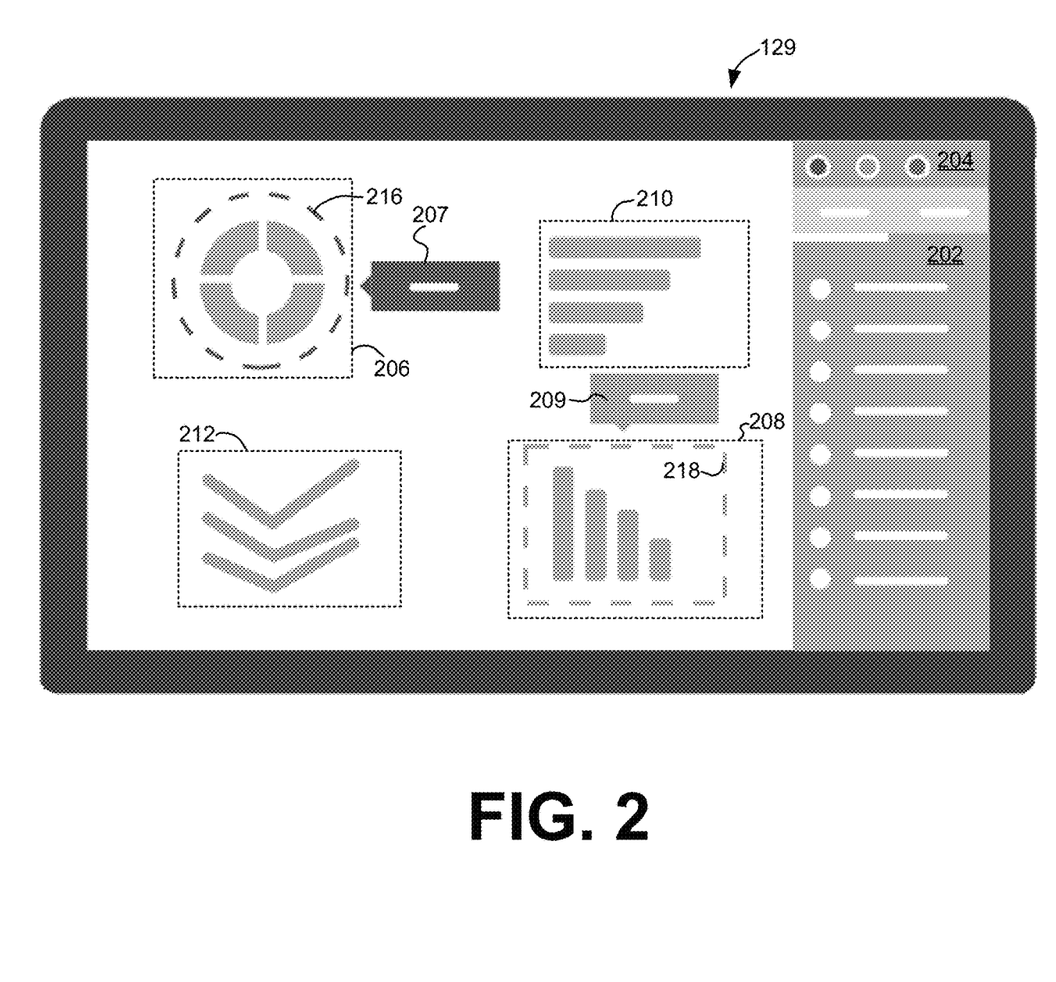
FIG. 2 shows additional detail of an example interface that includes features for collaborative design.

FIG. 2 shows one example of an interface 129 that is used to collaboratively design dashboard displays 129 having any number of objects 206, 208, 210, 212. In the example of FIG. 2, collaborating users are listed in a pane 202. Users who are actively editing a dashboard object may be identified in pane 202 using different colors 204, or through shading, boldfacing, italics or other differentiating features. When a user wishes to edit an object 206, 208, 210, 212, he or she simply selects the desired object using a cursor or other selector. The client software executing within the user's browser identifies the selected object to the platform 110. If the user has permission to edit that object and if the selected object is not already being edited by another user, the platform 110 will allow the user to edit the object, and will notify the editing user's browser to that effect. The user's display will then change to highlight the selected object and thereby allow editing. Highlighting may involve a change in color for the selected object, or three-dimensional effect in which the edited object appears "in front of" other objects, or any other effect to indicate that the object is being edited. Other objects not being edited by that user may be greyed out or otherwise changed to make them less prominent, as desired.

In the example shown in FIG. 2, two different users are simultaneously editing two different objects 206 and 208. Interface 129 in this example includes tags 207, 209 indicating which users are editing which objects 206, 208 (respectively). Tags 207, 209 may be color-matched to user names in list 202 to further identify the user doing the editing. This example also shows dotted lines 216, 218 around objects 206, 208; these lines can further delineate that the object 206, 208 is being edited.

The various features shown in FIG. 2 may be supplemented or otherwise modified in any number of ways. Dotted lines 216 and 218 may be omitted, for example, and/or tags 207, 209 could be omitted in other embodiments that indicate editing in other ways. Color or shading may be used in any manner, although some embodiments may use features other than color to indicate editing, as desired.

Other embodiments could display additional or alternate information within interface 129. Pane 202, for example, could provide revision histories (e.g., lists of changes made by different users) and/or a chat interface as desired. Pane 202 could be reversible, for example, so that it shows a revision history in a first view but a chat window in a second view. The two views may be toggled in any manner. In other embodiments, a chat window, revision history or other feature could be added as a separate pane or the like to allow real-time discussion of edits as they are occurring. Further embodiments may be enhanced with additional features, such as video or audio conferencing features, for additional collaborative effect, and other interfaces may be arranged and organized in any other manner.

Figure 3:
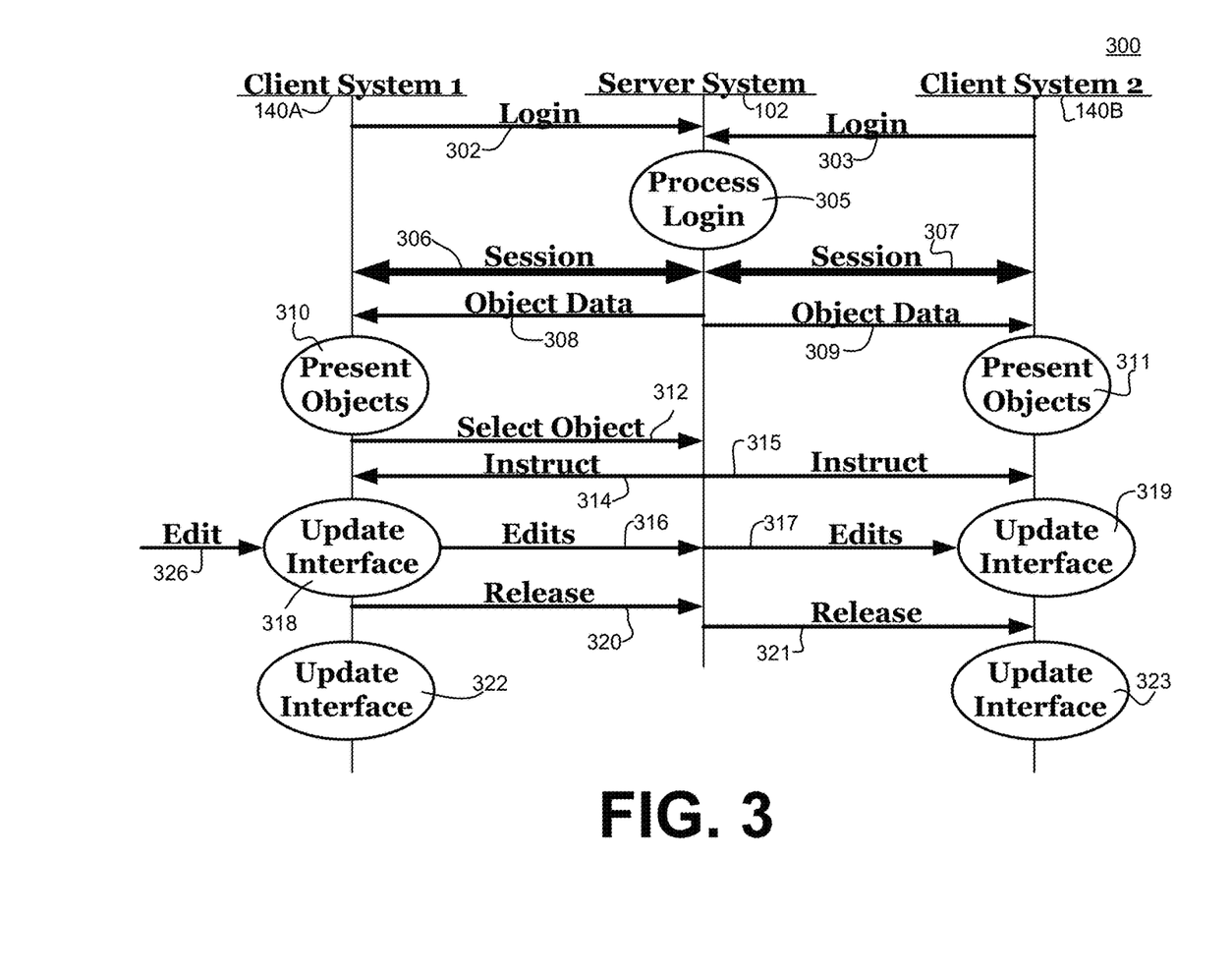
FIG. 3 is a flow diagram showing an example of a computerized process to support collaborative dashboard design by multiple users.

FIG. 3 provides one example of a computerized process 300 to display dashboard graphics and to manage simultaneous inputs from multiple users in a collaborative design environment. As shown in FIG. 3, two or more collaborating users each operating their own client computing device 140 jointly develop dashboard or other interfaces. The client computing devices 140A-B appropriately communicate with a platform 140 or other feature of a server computing system 102 to select objects for editing, to prevent simultaneous changes to interface objects while other users are editing the objects, and to display edits made by other users in real time. Other features and functions maybe provided, as desired.

Collaborative editing of dashboards or other interface features suitably begins by each user providing appropriate information for authentication and authorization. Functions 302 and 303 in FIG. 3 represent login information that is transmitted from the client computer devices 140A, 140B (respectively) to the server system 102 for authentication (function 305), although equivalent embodiments may process logins using separate processing systems, as desired. In some embodiments, each user is identified via a password, digital signature, biometric feature or other identifying characteristic. Such characteristics may be equivalently provided to a separate login server to obtain a cookie or other authentication token that may be provided to server system 102 in functions 302, 303 as appropriate.

Function 305 may also include enforcement of any permissions or authorization features, as appropriate. In many implementations, different users will have different permissions or "rights" to create, view, modify and/or delete interfaces or interface objects, as desired. The rights may be defined by an administrator and associated with user accounts in any manner. Server system 102 appropriately applies user rights to prevent unauthorized access, modification or deletion of interfaces, as appropriate. Such rights may be enforced by server 102 through the use of messages transmitted to each client device 140A-B, through limiting of data delivered to client devices 140A-B, and/or through other mechanisms as desired.

If users are authenticated, then the server system 102 and authenticated client systems 140A-B each establish a communications session 306, 307 (respectively) for subsequent communication. Sessions 306, 307 are typically separately established for each client system 140 so that clients may join or exit the collaborative design session at any time. Sessions 306, 307 may be implemented as TCP sessions for reliable and sustainable connections; other embodiments may equivalently use the user datagram protocol (UDP) for transfer of video traffic or large graphics files, and/or for other purposes. In many implementations, client systems 140A-B and server system 102 will communicate using HTTP "get" and "put" constructs that are transmitted over TCP connections, although equivalent embodiments could be constructed that use any other protocols as desired. Sessions 306, 307 will typically persist between server system 102 and client systems 140A-B until such time as the client system 140A-B explicitly disconnects from server system 102; other embodiments could include timeout, administrative disconnect and/or other features, as desired.

Sessions 306, 307 are used to transfer data and instructions between server system 102 and client systems 140A-B. In the example process 300 illustrated in FIG. 3, data 308, 309 about the objects and other aspects of the created interface is transferred over the established sessions 306, 307. Data may include bitmap or other graphical constructs in some embodiments, although other embodiments will store defining characteristics of certain graphs, charts or other elements within a browser applet or other application executed by client computers 140A-B such that only instructions need to be transferred to client systems 140A-B to describe the interfaces to be rendered and/or the updates to be made. Parameters such as titles, numerical limits, numerical values, color data, formatting data and the like can be provided to an API or other program executing by client devices 140A-B to enable each device 140A-B to generate appropriate graphical features for viewing by the viewer. Presenting of interface objects (functions 310, 311), then, typically involves rendering pre-defined interface elements using the parameters supplied with data 308, 309. Other embodiments could operate differently, however: server 102 could generate bitmap or other graphical imagery, for example, that could be equivalently delivered to client devices 140A-B for rendering, as desired. The client devices 140A-B therefore render the interface imagery for viewing by each collaborating user.

To edit an object, a user provides an input 324 using a cursor or other pointing mechanism to select the desired object for editing. The selected object is identified to the server system 102 via a message 312. Server system 102 appropriately verifies that the user of client device 140A has appropriate rights to edit the identified object and that the object is not already being edited by another user. If the object is available for editing by the user, then server system 102 sends an instruction 314 that directs client system 140A to allow edits to the selected object. Server system 102 may also send an instruction 315 to other client devices 140B directing such devices to update their user displays to indicate that the first user is editing the selected object.

As noted above, various embodiments may indicate that an object is being edited in any number of different ways. In some embodiments, the client device 140A that is receiving the edit instructions 326 changes the user display so that the actively-edited object is made more prominent though the use of color, 3-D effects and/or the like. Other client devices 140B may change the color of the selected object, may add dotted lines or other highlights to the edited object, may add a user tag indicating which user is making edits to the object and/or may otherwise update the display as desired. Server system 102 may also set a flag or other indicator associated with the selected object to indicate that the object is being edited; this flag may be subsequently checked to prevent multiple users from attempting to edit the same object.

As the first user provides additional inputs 326 to the client device 140A indicating changes to the selected object, descriptions of such changes are provided from the client device 140A to the server system 102 as edit messages 316. Such messages 316 may be forwarded from server system 102 to the other client devices 140B as messages 317 for real-time updating of the selected object on each of the different devices 140 during the editing process. Edit messages 316 may be forwarded without modification by server system 102 in some implementations, or server 102 may filter messages 316 to prevent unauthorized edits or the like prior to transmitting messages 317 to the other client devices 140B. Server system 102 may perform re-formatting or other actions on messages 316 as desired before forwarding messages 317 to each of the client devices 140. Each client system 140B processes the instructions 317 (function 319) to provide real-time updates during the editing process. Client system 140A may update the display (function 318) in response to user instructions 326, and/or in response to feedback instructions 317 received from a central server 102, as appropriate.

When the first user is done editing the selected object, he or she provides an appropriate user input 326 that triggers a release message 320 to be sent to server 102 via session 306. Server 102 suitably notifies the other collaborating systems 140B that the selected object has been released (function 321), thereby enabling each of the client systems 140A-B to update the screen displays to indicate that the object is no longer being edited (functions 322, 323).

Although FIG. 3 shows a simplified process 300 in which one collaborating system 140A is described as the editing system and one other system 140B is shown as a receiving system, in practice each of the various collaborating client systems 140A-B may each be able to select and edit different objects of the same dashboard or other interface 129. As described above, a flag or other setting tracked by server 102 can prevent simultaneous editing of the same object by multiple users, and edit updates from various editing sessions occurring on multiple client systems 140A-B may be shared with other client systems 140A-B as appropriate. This allows multiple parties to simultaneously edit different objects while maintaining real-time updates for each of the objects being edited, thereby greatly improving the interface design process.

Generally speaking, the various functions and features of process 300 may be carried out with any sort of hardware, software and/or firmware logic that is stored and/or executed on any platform. Some or all of process 300 may be carried out, for example, by logic executing within system 100 in FIG. 1. Other portions of process 300 may be performed by client devices 140A-B, as shown in the figure. To that end, the various functions shown in FIG. 3 may be implemented using software or firmware logic that is stored in memory 106 and executed by processor 105 as part of application platform 110, or using software or firmware logic stored in memory or mass storage of client devices 140A-B and executed by processors operating within client devices 140A-B, as appropriate. The particular hardware, software and/or firmware logic that implements any of the functions shown in FIG. 3 may vary from context to context, implementation to implementation, and embodiment to embodiment in accordance with the various features, structures and environments set forth herein. The particular means used to implement each of the various functions shown in FIG. 3, then, could be any processing structures that are capable of executing software and/or firmware logic in any format, and/or any application-specific or general purpose hardware, including any discrete and/or integrated circuitry.

Figure 4:
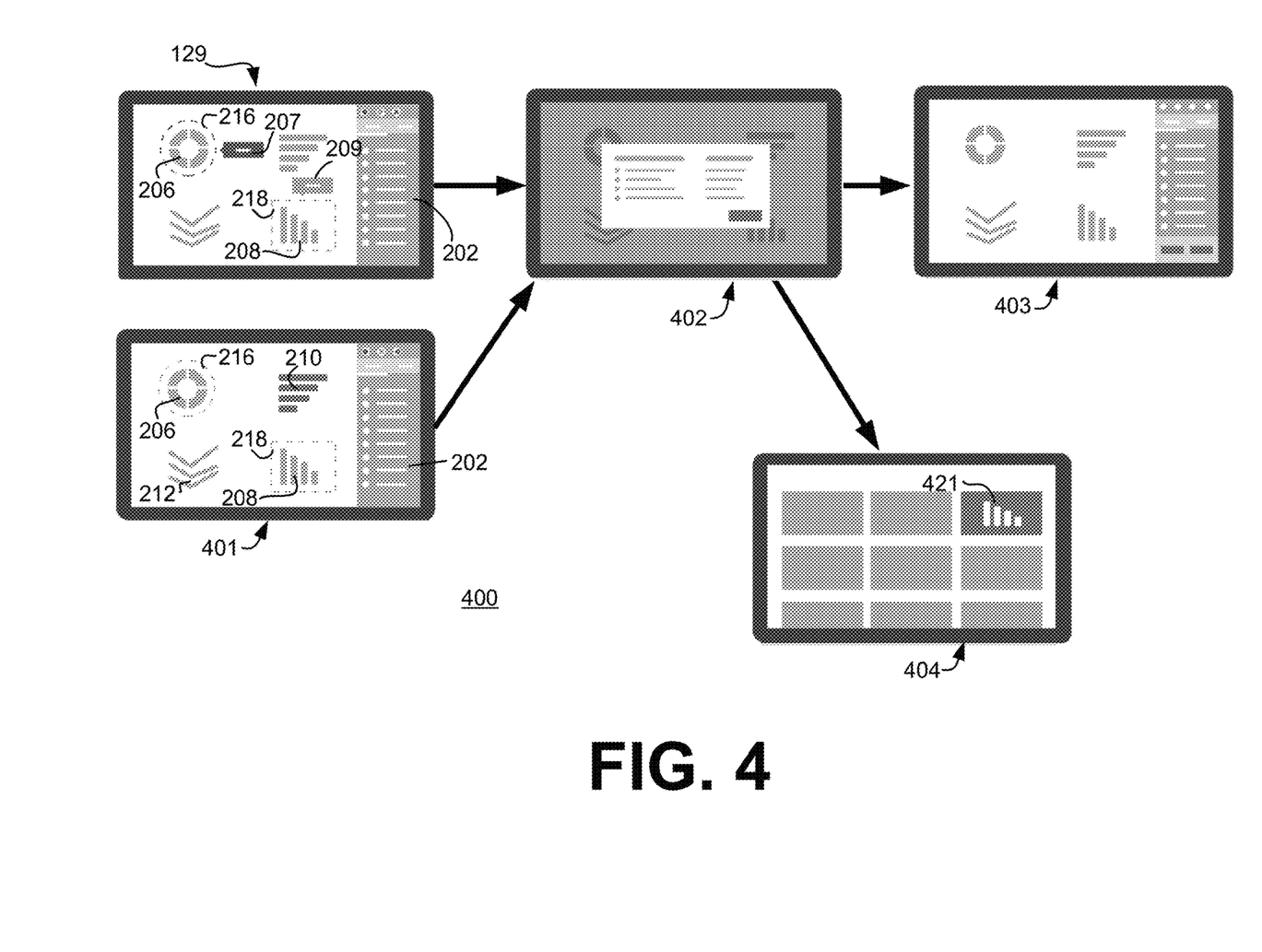
FIG. 4 is a diagram showing various interfaces relating to collaborative dashboard design and presentation.

FIG. 4 shows a collection of different interfaces 129, 401-404 that could be used in an example implementation 400 of a collaborative dashboard design system. Once again, equivalent concepts could be applied to other types of interfaces or other computer displays.

Interface 129 as illustrated in FIG. 4 corresponds to interface 129 shown in FIG. 2. As noted above, interface 129 could be used to highlights in the form of dotted lines 216, 218, color changes or the like that indicate which users are editing which interface objects. In this example, lines 216 and 218 indicate that objects 206 and 208 (respectively) are being edited by other users. User tags 207, 209 could also be provided to conveniently identify editing users; such tags could correspond to names provided in a collaborator pane 202 or the like. Color, shading or other effects could be used to further associate editors to information in the collaborator list, as desired.

Interface 401 as illustrated in FIG. 4 describes a personal editing interface that could be viewed by a user who is editing an object 210. As shown in this example, object 210 is shown in color, whereas other objects 206, 208, 212 are grayed out to indicate that the current user does not have access to make changes. As noted above, active objects 210 may be highlighted or emphasized in any other manner, including any use of color, shading, transparency, 3-D effects and/or the like. Interface 401 may also include dotted lines 401 to indicate those objects being edited by other users, as desired. Note that even inactive or grayed-out objects may be updated in real-time using process 300 above or the like so that the editors retain the ability to view changes made by other editors as such changes occur.

After a dashboard or other interface has been created, the interface may be forwarded for review by a manager, administrator or other person. Review processes could be administered using a screen similar to interface 402, which allows different users to be identified as recipients, reviewers, editors or other parties. Interface 402 may also allow an administrator to manually assign privileges to create, view, edit, comment, delete, share and/or the like through the use of checkboxes or other interface elements. Interfaces may be shared to groups, individuals, social networking groups and/or the like. Sharing may occur through hyperlinks to active images, through forwarding of graphical files showing sample interfaces, or in any other manner.

Completed dashboards 403 and other interfaces may be presented in any manner. In various embodiments, the completed dashboards are retained as data 130 that is processed by platform 140 within any number of virtual applications 128A-B. As noted above, platform 140 suitably populates the dashboards with real-time data or the like at run-time for effective presentation of current data. Dashboards 403 or dashboard formats may be retained as private data by one or more tenants, and/or dashboard formats may be shared with other tenants as desired. Other embodiments could retain dashboard formatting and other data on separate servers, as part of an API, or in any other manner.

In some implementations, data about the dashboard or other interface 403 may be collected and presented in its own "meta-dashboard": that is, a dashboard that presents information about a dashboard. Information tracked for dashboard interfaces 403 could include a number of views, an update frequency, metrics about the editing process (e.g., number of edits made, number of users involved in editing, frequency of edits and/or the like), and/or any other information as desired. Such information could be presented as a graph 421, chart, table or any other interface object, as desired.

According to various embodiments, then, collaborative design of dashboards or other user interfaces can be facilitated by coordinating the graphical displays produced by various client computer systems using a server computing system. Messages sent from the server computer system can direct the presentation of user interface elements on each of the client computer systems so that individual users can edit certain objects and view edits made by other users as such edits are made in real time. The finished interfaces may be shared, approved and monitored as desired so that future enhancements may be made and the benefits of created interfaces can be tracked.

The term "exemplary" is used herein to represent one example, instance or illustration that may have any number of alternates. Any implementation described herein as "exemplary" should not necessarily be construed as preferred or advantageous over other implementations, but rather as a non-limiting example.

Although several embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. To that end, the concepts set forth herein have been primarily described within the context of generating dashboard interfaces for a multi-tenant cloud computing platform. Equivalent embodiments, however, could be readily applied to other programming environments, platforms and/or the like.

What is claimed is:

1. A process executable by a computer system to facilitate simultaneous editing of dashboard imagery having a plurality of objects by a plurality of different client computing systems each operated by a different user and having an associated display, the process comprising:
   directing, by the computer system, each of the plurality of different client computing systems to simultaneously present the plurality of objects of the dashboard imagery on the display that is associated with the client computing system;
   receiving a first input from a first one of the plurality of client computing systems at the computer system that identifies one of the objects of the dashboard imagery to be edited by a first user of the first client computing system; and
   in response to the first input, the computer system providing a first instruction to the first one of the plurality of client computing systems to thereby enable editing of the identified object by the first user while the dashboard imagery is presented by the first client computing system, and also providing at least one second instruction from the computing system to each of the other client computing systems directing the other client computing systems to disable editing of the identified object while continuing to allow editing of the other objects of the dashboard imagery by the different users of the other client computing systems, wherein the at least one second instruction also directs each of the other client computing systems to augment the presentation of the identified object on the display associated with the other client computing system with a tag while the editing of the identified object is disabled, wherein the tag is a graphical image presented in proximity to and association with the identified object that identifies the first user who is editing the identified object.

2. The process of claim 1 wherein the first instruction initiates a change in a color of the object from a first color to a second color while the dashboard imagery is presented by the first client computing system.

3. The process of claim 2 wherein the at least one second instruction initiates a second change in the color of the object from the first color to a third color while the dashboard imagery is presented by the other client computing systems, and wherein the third color is different from the second color.

4. The process of claim 2 wherein the at least one second instruction initiates a tag while the dashboard imagery is presented by the other client computing systems, and wherein the tag identifies the first user who is editing the identified object.

5. The process of claim 2 wherein, when the first instruction also initiates a change in a color of the objects other than the identified object while the dashboard imagery is presented by the first client computing system.

6. The process of claim 1 wherein the dashboard imagery comprises a list of the plurality of different users.

7. The process of claim 6 wherein a color of the tag that is presented in proximity to the identified object matches a color of an entry in the list of different users that corresponds to the first user who is editing the identified object of the dashboard imagery.

8. The process of claim 7 further comprising:
   receiving a second input from the first one of the plurality of client computing systems at the computer system that identifies an end to the editing by the first user; and
   in response to the second input, providing a third instruction from the computer system to the first one of the plurality of client computing systems to thereby disable editing of the identified object by the first user, and also providing at least one fourth instruction from the computing system to each of the other client computing systems to thereby discontinue display of the tag that is presented in proximity to the identified object.

9. The process of claim 1 further comprising:
   receiving a second input from the first one of the plurality of client computing systems at the computer system that identifies an end to the editing by the first user; and
   in response to the second input, providing a third instruction from the computer system to the first one of the plurality of client computing systems to thereby disable editing of the identified object by the first user, and also providing at least one fourth instruction from the computing system to each of the other client computing systems indicating that editing of the identified object by the first user is complete.

10. A process executable by a first client computing system to present dashboard imagery having a plurality of objects on a display, the process comprising:
    establishing a session with a server system via a network, wherein the server system is in simultaneous communication with other client computing systems via the network;
    receiving data corresponding to each of the plurality of objects in the dashboard imagery via the session from the server system;
    presenting the dashboard imagery including on the display of the first client computing system based upon the data received from the server system, wherein the other client computing systems simultaneously present the same plurality of objects for display and editing;
    receiving a first user input from a user of the first client computing system, the first user input selecting one of the plurality of objects to be edited using the first client computing system;
    transmitting a first message by the first client computing system to the server system via the session to identify the selected object to be edited using the first client computing system to thereby initiate messages from the server system to the other client computer systems, wherein the messages direct the other client computer systems to prevent editing of the selected object by users of the other client computer systems and to augment the presentation of the dashboard imagery by presenting a tag that is a graphical image located in proximity to and in association with the identified object and that identifies the user of the first client computing system that is editing the identified object;

receiving a first instruction from the server system via the session to thereby enable editing of the identified object by the first client computing system, wherein the server system transmits other instructions to the other client computing systems to prevent simultaneous editing of the identified object by users of the other client computing systems;

updating the dashboard imagery to change the appearance of the selected object presented on the display;

in response to further user inputs from the user, providing edit instructions from the first client computing system to the server system via the session to thereby permit the server system to forward the edit instructions to other client computing systems and thereby enable the other client computing systems to display edits to the selected object in real time; and receiving a second instruction from the server system via the session and, in response to the second instruction, disabling edits by the user to a second one of the plurality of objects that has been selected for editing by a second user of one of the other client computing systems and, while the editing of the second object is disabled, augmenting the presentation of the second object by the first client computing system with a graphical image presented in proximity to and association with the identified object that identifies the second user who is editing the second object.

11. The process of claim 10 further comprising updating the second one of the plurality of objects in real time in response to subsequent instructions received from the server system via the session.

12. The process of claim 10 wherein the updating comprises changing a color of the selected object of the dashboard imagery while the selected object is being edited on the client computing system.

13. A computer system to generate simultaneous dashboard imagery having a plurality of objects on a plurality of different client computing systems each operated by different user, the computer system comprising a processor, a memory and an input/output interface, wherein the processor executes an application that performs an automated process that comprises:

receiving, via the input/output interface, a first input from a first one of the plurality of client computing systems at the computer system that identifies one of the objects of the dashboard imagery to be edited by a first user of the first client computing system; and in response to the first input, providing a first instruction to the first one of the plurality of client computing systems via the input/output interface to thereby enable editing of the identified object by the first user while the dashboard imagery is presented by the first client computing system, and also providing at least one second instruction via the input/output interface to each of the other client computing systems directing the other client computing systems to simultaneously disable editing of the identified object while continuing to allow editing of the other objects of the dashboard imagery by the different users while the dashboard imagery is presented by the other client computing systems, wherein the at least one second instruction also directs the other client computing systems to augment the simultaneous presentation of the dashboard imagery by presenting a tag while the editing of the identified object is disabled, wherein the tag is a graphical image located in proximity to and in association with the identified object that identifies the first user of the first computing system who is editing the identified object.

14. The computer system of claim 13 wherein the processor, memory and input/output interface are implemented as part of a cloud processing system.

15. The computer system of claim 14 wherein the application is created using a platform of the cloud processing system, wherein the platform dynamically creates the application based upon data stored in a database.

16. The computer system of claim 14 wherein the client computer systems are remotely-located computer systems that interact with the cloud processing system via a network, and wherein each of the client computer systems execute a client application that generates the dashboard imagery, that receives inputs from the different users, and that provides messages to the cloud processing system that describe edits to the objects made by the different users.

17. The computer system of claim 16 wherein the color of the tag that is presented in proximity to the identified object matches a color of an entry in the list of different users that corresponds to the first user who is editing the identified object of the dashboard imagery, and wherein the application further receives a second input from the first one of the plurality of client computing systems at the computer system that identifies an end to the editing by the first user and, in response to the second input, provides a third instruction from the computer system to the first one of the plurality of client computing systems to thereby disable editing of the identified object by the first user, and also provides at least one fourth instruction from the computing system to each of the other client computing systems to thereby discontinue display of the tag that is presented in proximity to the identified object that identifies the first user.

* * * * *